United States Patent
Esbensen et al.

(10) Patent No.: US 12,476,811 B2
(45) Date of Patent: Nov. 18, 2025

(54) MULTIMODAL MEMORY INTEGRATED CIRCUIT FOR USE IN UNBREAKABLE CRYPTOGRAPHY

(71) Applicant: Quantum Properties Technology LLC, Wilmington, DE (US)

(72) Inventors: Daniel M. Esbensen, Hayward, CA (US); Stephen Omohundro, Palo Alto, CA (US)

(73) Assignee: QUANTUM PROPERTIES TECHNOLOGY LLC, Wilmington, DE (US)

( * ) Notice: Subject to any disclaimer, the term of this patent is extended or adjusted under 35 U.S.C. 154(b) by 176 days.

(21) Appl. No.: 18/397,790

(22) Filed: Dec. 27, 2023

(65) Prior Publication Data

US 2025/0112773 A1    Apr. 3, 2025

Related U.S. Application Data (60) Provisional application No. 63/541,599, filed on Sep. 29, 2023.

(51) Int. Cl.
*H04L 9/32*        (2006.01)
*G11C 7/24*        (2006.01)

(52) U.S. Cl.
CPC .  *H04L 9/32* (2013.01); *G11C 7/24* (2013.01)

(58) Field of Classification Search
None
See application file for complete search history.

(56) References Cited

U.S. PATENT DOCUMENTS

| | | | |
|---|---|---|---|
| 8,099,762 B2 | 1/2012 | Valenti | H04L 9/0827 |
| 10,333,708 B1 | 6/2019 | Diamant | H04L 9/0631 |
| 10,984,138 B1 | 4/2021 | Esbensen et al. | G06F 21/78 |
| 11,108,550 B1 | 8/2021 | Esbensen et al. | |
| 11,341,254 B2 | 5/2022 | Esbensen et al. | |
| 2005/0117747 A1 | 6/2005 | Valenti et al. | H04L 9/00 |
| 2011/0085663 A1 | 4/2011 | Rozek et al. | H04L 9/00 |

(Continued)

FOREIGN PATENT DOCUMENTS

| | | | |
|---|---|---|---|
| CN | 108737114 | 11/2018 | H04L 9/32 |
| CN | 110581763 | 12/2019 | H04L 9/08 |

(Continued)

OTHER PUBLICATIONS

Notice of Allowance issued in China Application No. 202180003836. 5, with translation, dated Mar. 26, 2024, 6 pgs.

(Continued)

*Primary Examiner* — Bo B Jang
(74) *Attorney, Agent, or Firm* — HAYES SOLOWAY P.C.

(57) ABSTRACT

A multimodal integrated circuit for use in unbreakable cryptography has a chip substrate and a memory positioned on the chip substrate. Unauthorized access of key bits stored on the memory is prevented. An encryption device for use in cryptography has a truly random number generator (TRNG) stored on a non-transitory memory. At least a first and second encryption modules have a memory for key storage. The first key bits generated with the first TRNG are stored on the memories of the first and second encryption modules. Source data is decrypted or encrypted with the first key bits stored on the first and second encryption modules.

20 Claims, 9 Drawing Sheets

(56) References Cited

U.S. PATENT DOCUMENTS

| | | | | |
|---|---|---|---|---|
| 2014/0331050 | A1 | 11/2014 | Armstrong et al. | H04L 9/0855 |
| 2015/0089245 | A1 | 3/2015 | Altman | G06F 12/1408 |
| 2016/0218867 | A1 | 7/2016 | Nordholt et al. | H04L 9/0852 |
| 2016/0269177 | A1 | 9/2016 | Tanizawa | H04L 9/08 |
| 2016/0285629 | A1 | 9/2016 | Tanizawa | H04L 9/0855 |
| 2017/0105037 | A1 | 4/2017 | Svendsen | H04N 21/4367 |
| 2018/0309571 | A1 | 10/2018 | Arora | H04L 9/08 |
| 2019/0155959 | A1 | 5/2019 | Lee | G06F 3/0643 |
| 2019/0182034 | A1 | 6/2019 | McCarthy | G04L 9/14 |
| 2019/0238329 | A1 | 8/2019 | Leara et al. | H04L 9/08 |
| 2020/0351075 | A1 | 11/2020 | Griffin et al. | H04L 9/0637 |
| 2022/0006796 | A1* | 1/2022 | Steffen | H04L 63/0876 |
| 2023/0044214 | A1* | 2/2023 | Moon | H04L 9/0825 |

FOREIGN PATENT DOCUMENTS

| | | | | |
|---|---|---|---|---|
| CN | 110719165 | | 1/2020 | H04L 9/08 |
| CN | 111327419 | | 6/2020 | H03L 9/08 |
| WO | WO2013048674 | | 4/2013 | H04L 9/00 |

OTHER PUBLICATIONS

Andy, "How many satellites Orbiting the Earth in 2019?", Jan. 16, 2019, Pixalytics, (9 pages); https://www.pixalytics.com/satellites-orbiting-earth-2019.

Clark, Stephen, "Europe's Sentinel Satellites Generating Huge 'Big Data' Archive", Spaceflight Now, Nov. 4, 2020 (7 pages).

Dmitriev, Stan, "Autonomous cars will generate more than 300TB of data per year", Tuxera, Nov. 28, 2017 (5 pages), https://www.tuxera.com/blog/autonomous-cars-300-tb-of-data-per-year/.

Jurvetson, Steve "How a quantum computer could break 2048-bit RSA encryption in 8 hours", MIT Technology Review, May 30, 2019 (9 pages); https://www.technologyreview.com/s/613596/how-a-quantum-computer-could-break-2048-bit-rsa-encryption-in-8-hours/.

Latacora, "Cryptographic Right Answers", Apr. 3, 2018 (9 pages), https://latacora.micro.blog/2018/04/03/cryptographic-right-answers.html.

Patrizio, Andy, "IDC: Expect 175 zettabytes of data worldwide by 2025", Network World, Dec. 3, 2018, (4 pages); https://www.networkworld.com/article/3325397/idc-expect-175-zettabytes-of-data-worldwide-by-2025.html.

Random Bit Generation information website, CSRC, NIST, https://csrc.nist.gov/projects/random-bit-generation, Created May 24, 2016, Updated Jun. 22, 2020.

Rosenberg, Barry, "DISA Seeks Encryption That Quantum Computers Can't Break", Breaking Defense, (3 pags) https://breakingdefense.com/2019/05/disa-seeks-encryption-that-quantum-computers-cant-break/.

Shacklett, Mary, "Movie animation firm's big data challenges present lessons to learn", Big Data, Oct. 6, 2014, https://www.techrepublic.com/article/movie-animation-firms-big-data-challenges-present-lessons-to-learn/ (8 pages).

Switch Technology, "Shield Encrypts your Network Communication through eMax" (5 pages) https://switchtech.com/shield/, 2019.

Wikipedia, "EdDSA", (5 pages); https://en.wikipedia.org/wiki/EdDSA#Ed25519.

Wikipedia, "General Data Protection Regulation", (20 pages); https://en.wikipedia.org/wiki/General_Data_Protection_Regulation.

Wikipedia, "Health Insurance Portability and Accountability Act", (15 pages); https://en.wikipedia.org/wiki/Health_Insurance_Portability_and_Accountability_Act.

Wikipedia, "One-time pad", (10 pages); https://en.wikipedia.org/wiki/One_time_pad.

* cited by examiner

MULTIMODAL MEMORY INTEGRATED CIRCUIT FOR USE IN UNBREAKABLE CRYPTOGRAPHY

CROSS REFERENCE TO RELATED APPLICATION

This application claims benefit of U.S. Provisional Application Ser. No. 63/541,599, entitled, "Multimodal Memory Integrated Circuit for use in Unbreakable Cryptography" filed Sep. 29, 2023, the entire disclosure of which is incorporated herein by reference.

FIELD OF THE DISCLOSURE

The present disclosure is generally related to data security and more particularly is related to multimodal memory integrated circuit for use in unbreakable cryptography.

BACKGROUND OF THE DISCLOSURE

Securing data through encryption is essential to many forms of non-public data, such as military data, governmental data, healthcare information, financial information, corporate data, and others. Various forms of data encryption exist, where the source data is encoded and can only be accessed or decrypted by using a specific key. One-time pad (OTP) is a data encryption technique which is highly secure, and recognized as the most efficient, provably unbreakable form of cryptography. As such, the use of OTP encryption is likely to be integral to data encryption as quantum computing and Artificial General Intelligence (AGI) technologies develop. With AGI technologies in particular, heightened steps are needed to ensure that Artificial Intelligence (AI)-enabled systems are not capable of breaking encryptions that were traditionally secure against non-AI-enabled systems.

While OTP encryption is beneficial, it also has specific requirements which can be viewed as making the use of OTP encryption awkward. For instance, OTP encryption requires an encryption key to be as large as the data being encrypted, such that the size of the encryption key can be significant when a large data set is encrypted. Additionally, OTP requires the prepositioning of keys, e.g., the distribution of the key to the recipient or recipients of the encrypted data in advance. Prepositioning of keys can present challenges with ensuring that the keys themselves remain secure from unauthorized individuals and system.

Secure and efficient distribution of OTP encryption keys remains fundamental to the successful use of OTP encryption. As such, various methods and systems have been used and presented to allow for an encryption key to be prepositioned efficiently and without negatively affecting the security of the OTP encryption method. However, for highly secured data in particular, there still exists concerns relative to trusting the process of key distribution in OTP encryption, and for other cryptographic techniques.

Thus, a heretofore unaddressed need exists in the industry to address the aforementioned deficiencies and inadequacies.

SUMMARY OF THE DISCLOSURE

Embodiments of the present disclosure provide a multimodal integrated circuit for use in unbreakable cryptography.

Additional embodiments of the present disclosure provide a system and method for secured cryptographic key distribution. Briefly described, in architecture, one embodiment of the system, among others, can be implemented by allowing for the delivery of an OTP key or other cryptographic key securely to a user in a manner which enhances the user's trust in the security of the keys used.

Embodiments of the present disclosure provide a system and method for a multimodal integrated circuit (IC) chip for use in cryptography. Briefly described, in architecture, one embodiment of the system, among others, can be implemented as follows. The multimodal IC chip has a chip substrate. A memory is positioned on the chip substrate. When key bits from key data are stored on the memory, unauthorized access of the key bits is prevented.

The present disclosure can also be viewed as providing an encryption device for use in cryptography. Briefly described, in architecture, one embodiment of the device, among others, can be implemented as follows. An electro-computerized device has at least one non-transitory memory. A first truly random number generator (TRNG) is stored on the non-transitory memory. At least a first encryption module has a memory for key storage. At least a second encryption module has a memory for key storage. The first key bits generated with the first TRNG are stored on the memories of the first and second encryption modules. Source data is decrypted or encrypted with the first key bits stored on the first and second encryption modules.

The present disclosure can also be viewed as providing methods of providing secure data encryption. In this regard, one embodiment of such a method, among others, can be broadly summarized by the following steps: generating first key bits with a first truly random number generator (TRNG) stored on a non-transitory memory of an electro-computerized device; storing the first key bits on a memory of at least a first encryption module and a second encryption module; and encrypting or decrypting source data with the first key bits stored on the first and second encryption modules.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

In OTP encryption and other forms of encryption, trust relative to the distribution of the key is a highly important consideration for individuals or entities using the encryption technique. For instance, when a product using OTP encryption is manufactured, the manufacturer may distribute the OTP key to a customer, and the customer needs to be able to trust the manufacturer that the key provided by the manufacturer will remain secured. In this scenario, the customer must trust that the manufacturer themselves won't use the key to access encrypted data, but they must also trust the manufacturer's system is not vulnerable to third parties gaining access to the key through the manufacturer's system. Since OTP encryption is used for the very highest security levels, e.g. such as within the government, military, or to encrypt highly confidential or important information, individuals who use OTP encryption are often unwilling to leave any level of security of their encrypted data to the trust of another party, such as the manufacturer of an OPT-enabled device or another party.

To solve this problem and provide efficient, provably unbreakable data security, the present disclosure is directed to hardware devices used in highly secured cryptography. These may include, for instance, multimodal integrated circuits for use in unbreakable cryptography. Additionally, these devices may include improvements in the distribution of cryptographic keys generally, and in particular, OTP keys, where the user of the OTP-encrypted data retains control over the security of the OTP key such that the user can have and maintain a high degree of confidence that the OTP key will remain unbroken. These devices, techniques and systems ultimately allows the user of the OTP encryption to not only have high security OTP keys, but also to be sure that those OTP keys will remain secured before and during their use. The improvements discussed herein may include physical hardware devices, systems, and/or methodologies which allow for an increase of the security of cryptographic keys, but also which will increase a user's trust in the security of the keys used. It is noted that the various improvements may be used independently of one another, or in various combinations, all of which are considered within the scope of the present disclosure.

In one instance, an improvement to the distribution of cryptographic keys may be realized from key bits that are prevented from unauthorized access. In accordance with this disclosure, unauthorized access may be characterized as access to the key bits or a portion thereof where the access is not intended, not desired, or is the result of nefarious activity by an individual or entity.

Figure 1:
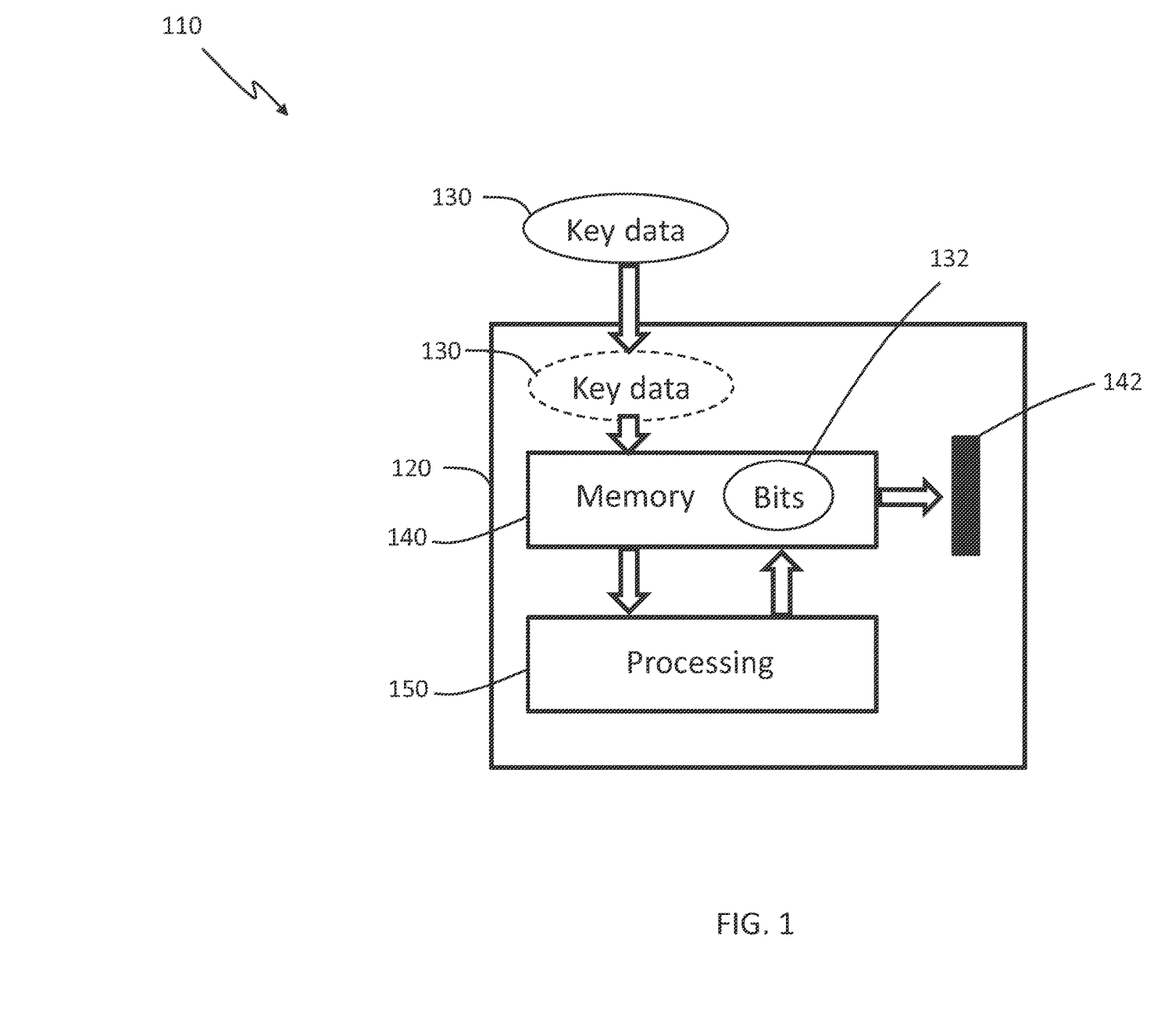
FIG. 1 is a diagrammatical illustration of an improved device for the distribution of cryptographic keys in one example, in accordance with exemplary embodiments of the present disclosure.

FIG. 1 is a diagrammatical illustration of an improved device 110 for the distribution of cryptographic keys in one example, in accordance with exemplary embodiments of the present disclosure. In particular, FIG. 1 depicts improvement to the distribution of cryptographic keys may be realized from key bits that prevented from unauthorized access by preventing the key bits from being read from integrated circuit (IC) leads. As shown, FIG. 1 illustrates an IC chip 120 or chip package, which has a structure or chip substrate upon which components are located. The IC chip 120 is enabled to store a cryptographic key. As shown, the IC chip 120 may receive key data 130, and the key bits 132 of the key data 130 are stored in a memory 140 of the IC chip 120, such as within one or more memory cells of the memory 140. Loading the key data 130 with the key bits 132 on the memory 140 may be done when the IC chip 120 is manufactured, or at another point in time prior to use of the IC chip 120, and typically by a manufacturer or producer of the IC chip 120. The memory 140 may be a non-transitory memory device which is positioned on the chip substrate of the IC chip 120. Once stored on the memory 140, a processor 150 or processing system may access the key bits 132 from the memory 140.

In conventional memory ICs, the chip leads, e.g., electrical connectors to and from the IC chip 120, may be used to either read or write to specified memory locations of the IC chip. The device 110 allows for key data 130 to be received and stored on the memory 140, which allows the key bits 132 to be secure, but the IC chip 120 does not physically allow for the key bits 132 of key data 130 to be read out of the IC chip 120 once stored. For instance, the IC chip 120 may be free from chip leads or other structural components which allow key data 130 to be read from the memory 140, such that access to the key data 130 is achieved only through the processor 150 positioned integral with the IC chip 120 itself. Without a physical ability to read data on the memory 140, the key bits 132 are effectively blocked from being read out of the IC chip 120, or otherwise accessed on the memory 140. This is indicated at block 142 in FIG. 1. As such, the key retrieval from the IC chip 120 is impossible. The use of the key bits 132 is in encrypting or decrypting data, but those key bits 132 cannot be otherwise accessed. With the device 110 of FIG. 1, even if an unauthorized person, such as an adversary, has physical access to the IC chip 120 or encryption and decryption hardware which contains the IC chip 120, they are not able to retrieve any bits of the key since the key bits 132 cannot be read from the memory 140 of the IC chip 120.

Figure 2A:
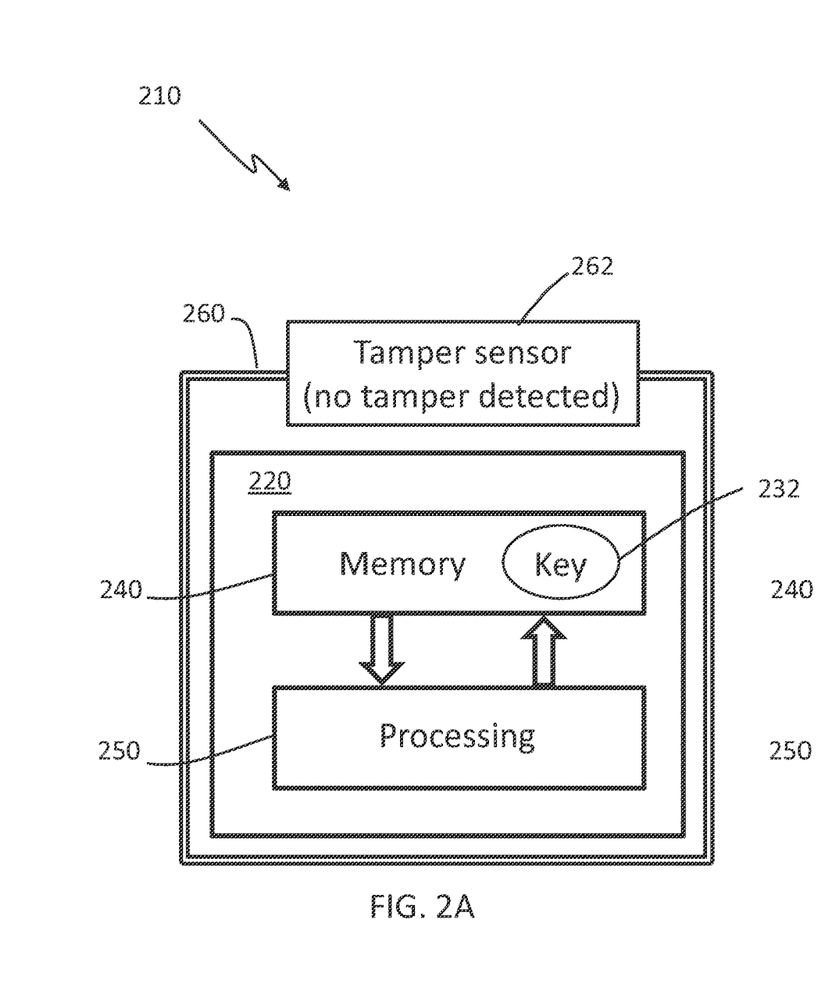
FIGS. 2A-2B are diagrammatical illustrations of a device for distribution of cryptographic keys in one example, in accordance with exemplary embodiments of the present disclosure.
Figure 2B:
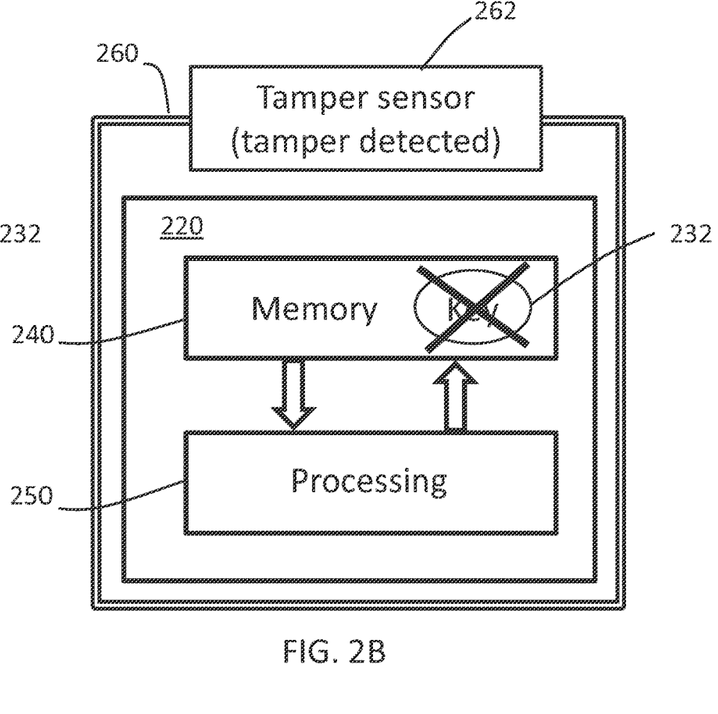

Even with the IC chip 120 which has no physical ability for key data 130 to be read from the memory 140, there still exists a possibility that someone attempts to gain access to the memory 140 from an external system, such as, by adding leads to the memory or otherwise using a technology to tamper with or access the memory 140. To prevent this situation, another improvement to the distribution of cryptographic keys may be realized from tamper-sensitive circuitry which deletes key data upon detection of tampering. FIGS. 2A-2B are diagrammatical illustrations of a device 210 for distribution of cryptographic keys in one example, in accordance with exemplary embodiments of the present disclosure. FIGS. 2A-2B illustrate an IC chip 220 or chip package, which is enabled to store a cryptographic key in the form of key bits 232 which are derived from key data. The key bits 232 are stored in a memory 240 of the IC chip 220, such as within one or more memory cells of the memory 240, as described relative to FIG. 1. Once stored on the memory 240, an integral processor 250 or processing system may access the key bits 232 from the memory 240.

Very sophisticated individuals, entities, or programs may attempt to directly access stored key bits on an integrated circuit by using an electron microscope, etching away portions of the chip, or other highly sophisticated methods. In the device 210, the IC chip 220 may be connected to one or more tamper sensors 262, such as by being positioned within a tamper enclosure 260 which has one or more tamper sensors 262 connected thereto, or otherwise able to sense characteristics of the tamper enclosure 260, as shown in FIG. 2B. The one or more tamper sensors 262 may include sensors which sense or detect a tamper event. The tamper event may be any violation of the integrity of the tamper enclosure 260, or another aspect of the device package, and/or sensing of information or characteristics which can indicate a tamper situation. For instance, sensing changes in temperature, voltage, and other relevant physical environmental variables may be tamper events.

If the tamper enclosure 260 senses the tamper event, indicating the device 210 or memory 240 is tampered with or the device 210 is sensed to be in an environment outside of prescribed bounds, the tamper sensor 262 causes the key bits 232 within the memory 240 to be deleted or otherwise destroyed, such that all stored cryptographic keys are deleted. This situation is depicted in FIG. 2B, where the tamper sensor 262 has detected a condition which evidences a tamper to the tamper enclosure 260 or an environment which is associated with a tamper situation, and thus cause the key bits 232 to be deleted or erased. While this technique will prevent immediate use of the device 210, at least with regards to providing the key data, it maintains cryptographic security even in the face of sophisticated attacks.

It is noted that the technique for causing the key bits 232 within the memory 240 to be deleted or otherwise destroyed may include various techniques for tamper-evident wiping. For instance, in one example a zeroization technique may be used where the key bits are deleted by writing them to zero (or zeroing them), such that all bits associated with the keys are zero. Similarly, a technique may be used to write all bits to one, e.g., "oneizing" the bits or performing "oneization". Converting all bits to one may have benefits in preventing residual evidence of original bit value, since changing a bit from one to zero can, in some instances, leave a residual indication that the bit was original a one. Other techniques for tamper-evident wiping of the key bits 232 may also be used.

Furthermore, it is noted that tamper resistant enclosures can be used specifically with hardware devices, such as a multimodal IC chip, which together can be used to ensure unbreakable encryption of data, even in the presence of artificial intelligence (AI) computing. For instance, with the popularity of AI computing, there is a growing concern for how AI and artificial general intelligence (AGI) systems can be controlled. It has been recognized that AGI systems cannot be controlled with human-based or software-based security systems, since the AGI system itself can modify or manipulate humans or software. AGI system can only be controlled with a hardware-level encryption device or method, such as the systems and methods described herein, where it is possible to be absolutely sure that the hardware can hold encrypted information since the hardware can delete encrypted information in the event that tampering is detected. This type of device or method, therefore, will have increasing importance to the use and control of AI and AGI systems used in the future.

Figure 3A:
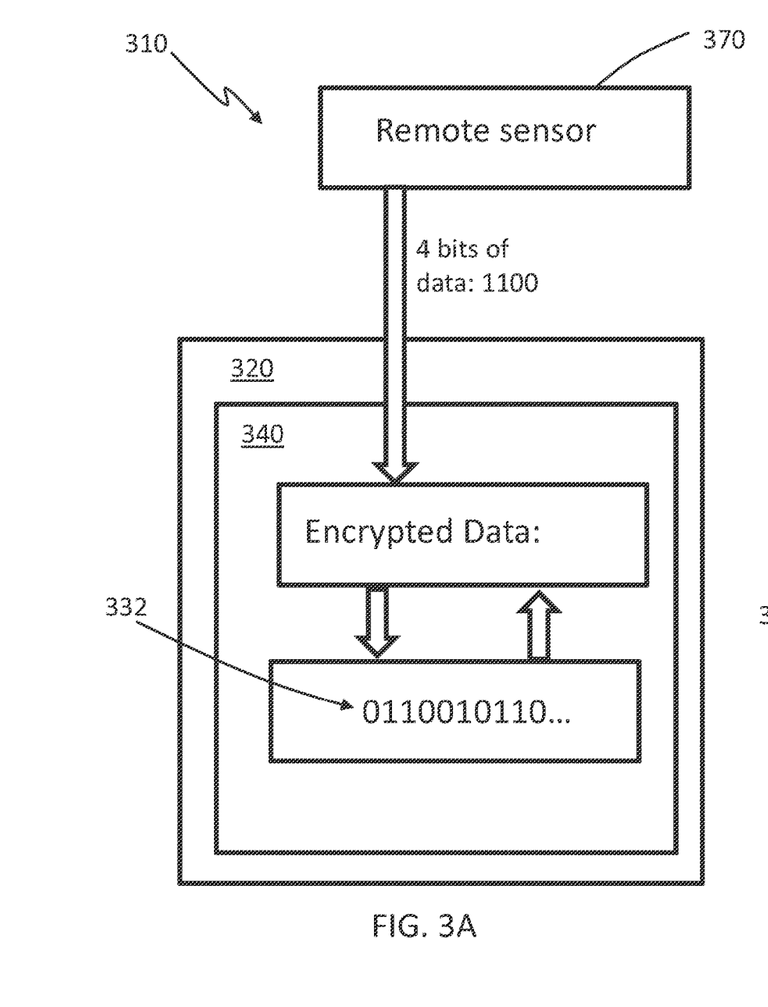
FIGS. 3A-3B are diagrammatical illustrations of a device for distribution of cryptographic keys in one example, in accordance with exemplary embodiments of the present disclosure.
Figure 3B:
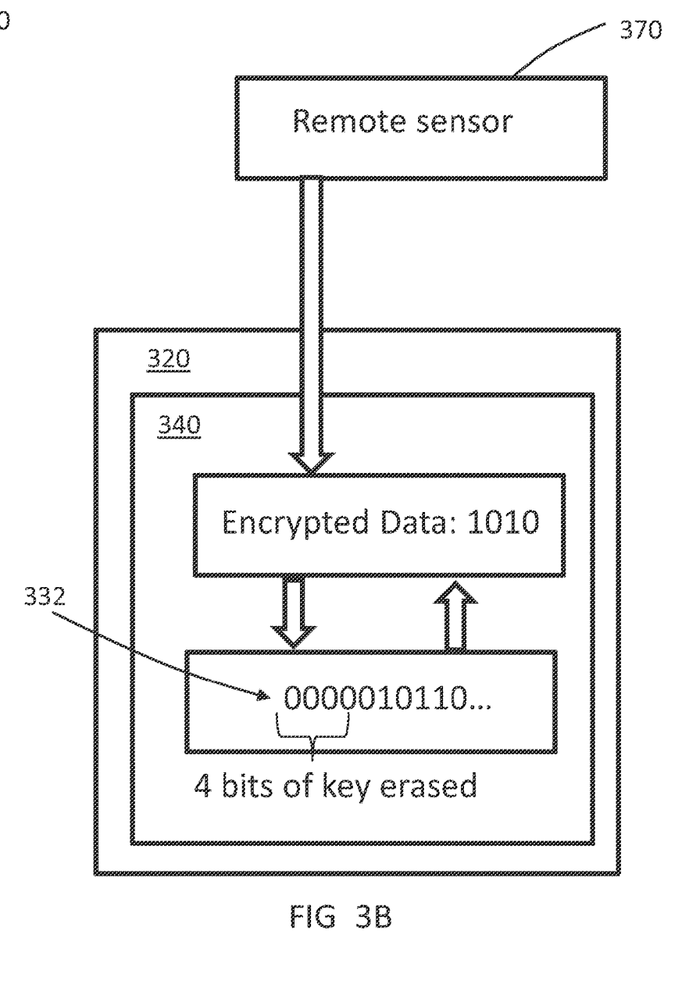

In another example, another improvement to the distribution of cryptographic keys may be realized from key bits that are deleted as they are used. For example, many applications of quantum cryptography may involve remote sensing devices, such as video cameras, or other sensing devices, which are recording environmental information. This information may be captured, then encrypted, and then the encrypted data may be stored. FIGS. 3A-3B are diagrammatical illustrations of a device 310 for distribution of cryptographic keys in one example, in accordance with exemplary embodiments of the present disclosure, where an IC chip 320 or chip package, which is enabled to store this captured data on a memory 340. The memory may store the captured data retrieved from a remote sensing device 370, such as a video camera, as shown in FIG. 3A. In this example, the captured data is 4 bits of data depicted as "1100".

To encrypt the captured data, the device 310 may retrieve a portion of the bits 332 of the cryptographic key stored on the memory 340 and use it to encrypt the captured data, as shown in FIG. 3B. The result is stored on the memory 340 and the key bits 332 used for the encryption are deleted. This technique ensures that no unencrypted information remains on the device 310. If a hostile party obtains the remote sensor device 370, it is mathematically impossible for them to reconstruct the stored sensor information. It is noted that this same process may occur within the decryption device during decryption. As the encrypted information comes into the decryption device, it is combined with the stored cryptographic key to form the decrypted message and the used bits of the key are deleted. This helps ensure that the cryptographic key cannot be extracted from the device.

In other examples, heightened encryption and trust of encrypted keys can use an encryption module which stores encryption keys. The encryption module may include an electro-computerized device having at least a non-transitory memory. The encryption module may be provided by an encryption module provider, which is generally an entity which provides the encryption module, but more specifically, will often be a corporate or governmental entity which is in the business of providing an encryption module. In one example, an encryption module provider may provide two or more encryption modules containing identical key bits to end users. This allows the parties using these encryption modules to communicate securely with one another from remote distances, since both parties have the encryption keys to decrypt encrypted data.

Figure 4:
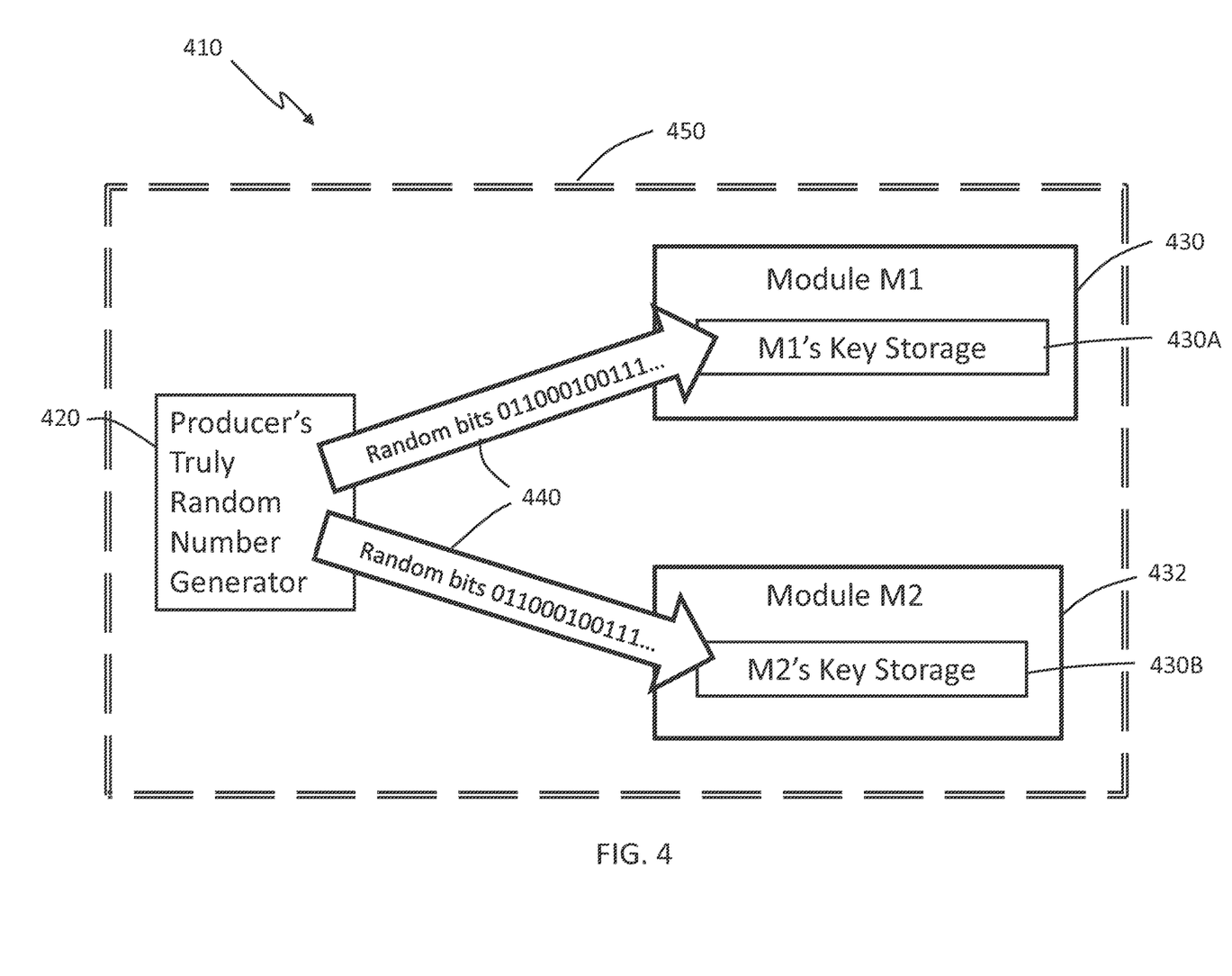
FIG. 4 is a diagrammatical illustration of a device for distribution of cryptographic keys in one example, in accordance with exemplary embodiments of the present disclosure.

One example of the distribution of cryptographic keys may be realized from a module producer key load process to two or more linked modules, as shown in FIG. 4, which is a diagrammatical illustration of a device 410 for distribution of cryptographic keys in one example, in accordance with exemplary embodiments of the present disclosure. In the most basic form of this example, the producer of an encryption module must be trusted. As shown in FIG. 4, the module producer possesses a reliable truly random bit generator 420. The encryption module producer may produce sets of linked hardware encryption/decryption modules, such as module M1 430 and module M2 432, but any number of modules may be used. The provider uses generator 420 to generate the random key bits 440 which are stored in key storage units 430A, 430B in each of module M1 430 and module M2 432, respectively, and in any other Mn modules.

It may be important that this process of adding random key bits 440 on to the modules 430, 432 be secret to the provider themselves, and it should be accomplished in a Faraday cage 450, unconnected to any networks. The Faraday cage 450 may be an enclosure which is capable of blocking electromagnetic fields. Additionally, in one example the only storage of the key bits should be in the desired modules 430, 432, such that the modules 430, 432 do not include other data. Thus, in this simplistic example, the desired number of modules 430, 432 may be loaded with key bits and are distributed to the end users.

In other examples, it may be more beneficial to also include ancillary data about the encryption. For instance, it may be valuable to also store metadata about the key including the identity of the encryption module producer, the serial number of the production equipment, the number of bits produced, and the number of modules loaded with the key, among other possible data. This may allow the user to ensure that the number of modules with the key is the number of modules in their possession and that they are physically intact.

Further, the example of FIG. 4 may require the end users to trust the encryption module providers not to have hacked their key production hardware to store additional sanctioned copies of the key. This risk can be reduced by auditing the encryption module producer's equipment. It is also noted that the specific form of the encryption module and other production equipment may be beneficial to the technique disclosed herein. For instance, the random key generator 420 of the encryption module producer, and all the modules to be loaded may be contained in a tamper sensing environment, such as is disclosed relative to FIGS. 2A-2B. This loading environment may be encased in a Faraday cage 450 to prevent any signals containing the stored bits from escaping the location where they are loaded onto the modules. Cameras or other sensing or data capture devices can be used to record the process of loading the key bits 440 showing the devices isolated in the tamper-resistant enclosure and the video may serve as part of the key provenance for the customer or end user. Additionally, the producer may attest that the key loading process was accomplished within the secure enclosure without violating the seals and protection mechanisms to prevent any access to the generated key bits 440 during the process of loading.

Once loaded into the devices 410, there may be no access to the cryptographic key bits 440 through the leads of the devices 410, as discussed relative to FIG. 1, for instance. As one of many alternative implementations of this process, it may be possible to use a random bit generator included as a part of one of the modules 430, 432 which then generates the key bits 440 loaded into the other modules, e.g., Mn.

The module producer key load process described relative to FIG. 4 is highly reliable and secure for the end user as long as they trust the cryptographic device producer to have carried out the process correctly and to have not violated the security integrity of the load process environment. However, the end user may use a secondary key update process, which may be performed by the end user. This process may further enhance the security of the key from the module producer, but it also may be used to eliminate the need for any trust of the original device producer.

Figure 5:
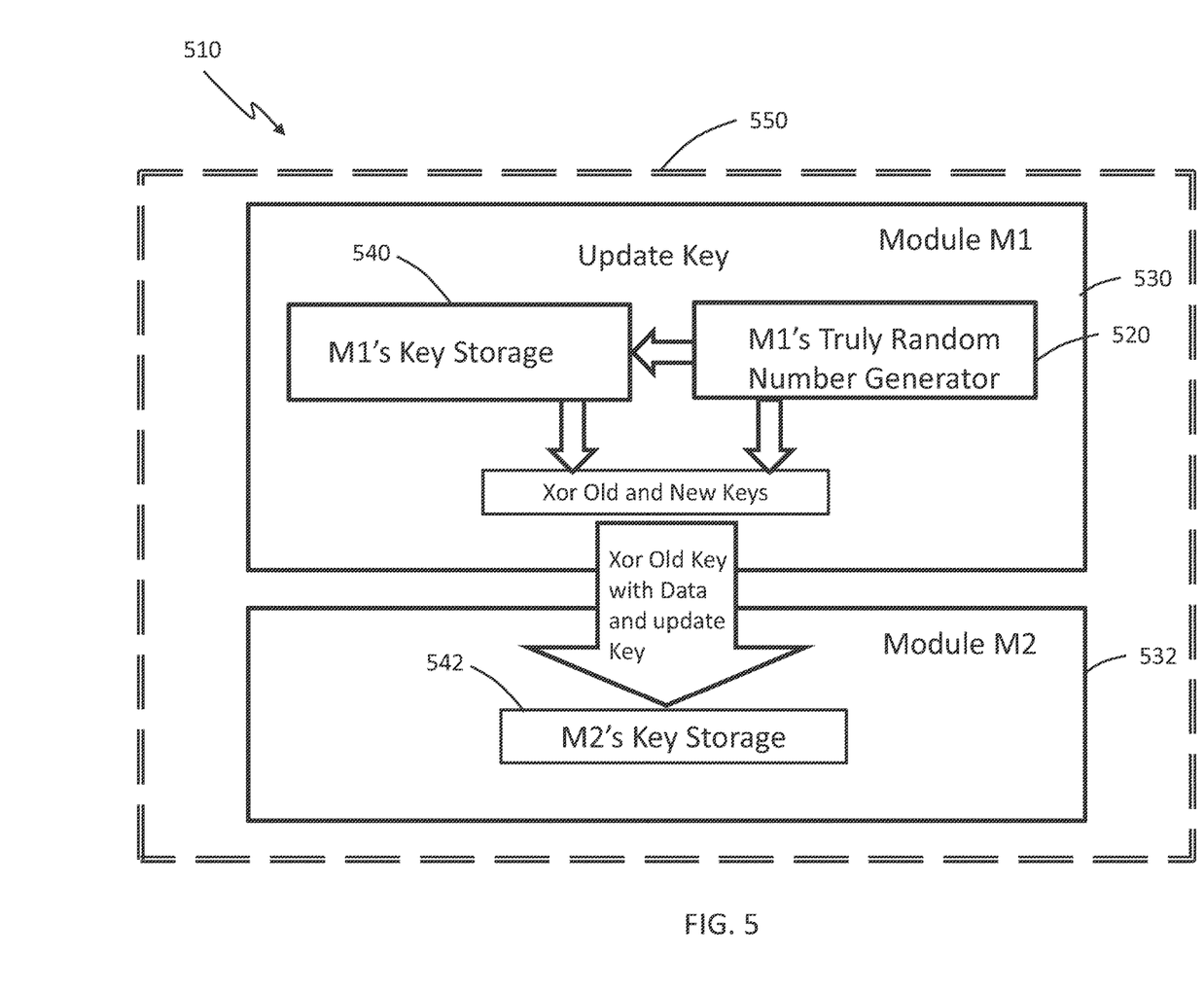
FIG. 5 is a diagrammatical illustration of a device for distribution of cryptographic keys in one example, in accordance with exemplary embodiments of the present disclosure.

As shown in FIG. 5, which is a diagrammatical illustration of a device 510 for distribution of cryptographic keys in one example, in accordance with exemplary embodiments of the present disclosure, the end user of the encryption key has a secure, tamper-resistant Faraday cage 550 which provides a protected environment for updating the two or more modules M1, M2, 530, 532 with identical keys and identical key bits loaded onto them.

One of the devices or modules is selected as the "master", e.g., module M1, 530 in FIG. 5, and it has an onboard random number generator 520 which is used to update its own key bits and the keys of the other devices in its group, e.g., other modules such as M2. With the modules M1 and M2, in this example, connected inside the secure secondary process environment of the Faraday cage 550, the master device M1 may generate the new random key. This new random key is stored in the key memory 540 of the module M1, 530, and the random key is encrypted using the module producer key. In other words, the key bits originally provided by the entity producing the modules 530, 532 is encrypted, such as using an Xor process, with the new key bits generated from the onboard TRNG of the module M1 530. Thus, a two-step encryption process is used where the original key bits are further encrypted with a secondary set of key bits which are derived from the module M1 530 itself. This two-step encrypted key may then be sent to each of the other modules, such as module M2, 532 or any other Mn modules. Each other module receives the encrypted new key, decrypts it using the stored module producer key, and stores the new key in its memory 542.

The end result of the process described relative to FIG. 5 is that each module 530, 532 has the same new random key. This key has never been exposed on any module lead. The end user can be absolutely sure that the module producers have no information about the new key, since it was generated on the modules themselves after they were in the control of the end user. As such, the end user can have absolute trust in its security. Additionally, no employee of the user or other individual can have access to the new key either since it is encrypted. Even if someone were to surreptitiously record all of the leads connecting modules during the secondary key update process, the key bits never appear unencrypted. This allows the end user to fully trust both the original producer and their own employees involved in the update process.

Figure 6:
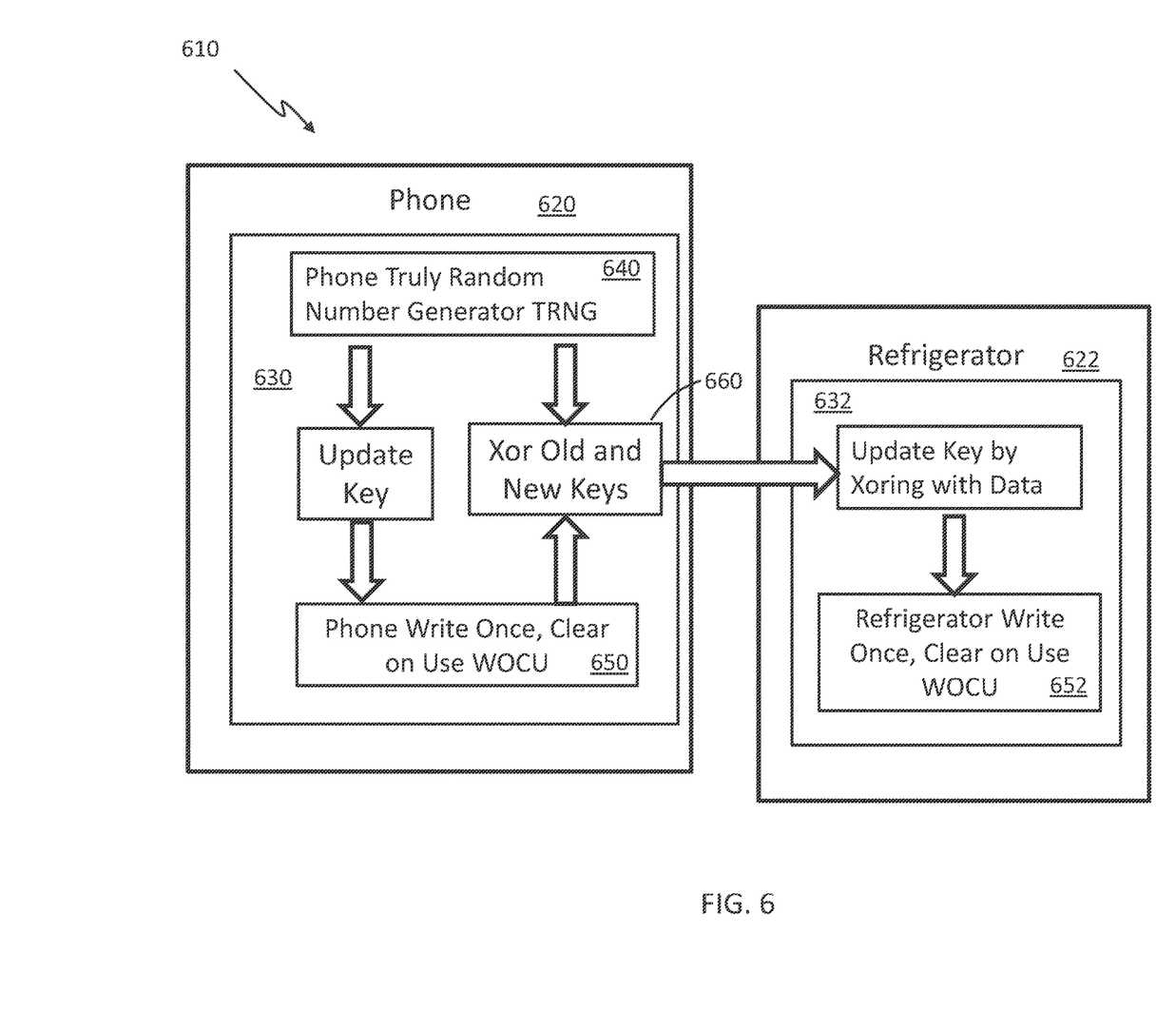
FIG. 6 is a diagrammatical illustration of a key distribution process between two IoT devices, in one example, in accordance with exemplary embodiments of the present disclosure.

FIG. 6 is a diagrammatical illustration of a key distribution process 610 between two IoT devices, in one example, in accordance with exemplary embodiments of the present disclosure. As shown, two or more IoT-enabled devices may be provided, where a device such as a smart phone 620 may electronically pair with another device, such as a refrigerator 622. Any other type of IoT or non-IoT-enabled devices may also be used, all of which are within the scope of the present disclosure. The phone 620 may have an encryption chip 630 which has both a truly random number generator (TRNG) 640 and a "Write Once, Clear on Use" (WOCU) circuit 650. The refrigerator 622 also has a WOCU circuit 652 on its chip 632. As delivered from the manufacturer, the phone 620 and refrigerator 622 may arrive with the manufacturers or producer generated key.

During the pairing process between the phone 620 and the refrigerator 622, the phone 620 generates a new key using the TRNG generator 640 and stores the new key in the phone's WOCU memory 650. The new key is then transmitted to the refrigerator 622 along with the key from the manufacturer. Both keys may be transmitted in an encrypted state, such as by using an Xor process. This is shown at block 660. The refrigerator 622 receives the encrypted key, decrypts it with the stored producer's key, and stores the new key in its WOCU circuit 652. The phone 620 and the refrigerator 622 now have the same key which has never been exposed on any wire in either the phone 620 or the refrigerator 622, or in the Bluetooth signal or other communication signal between them. The two devices may communicate with full confidence of unbreakable security.

Once pairing has completed the refrigerator 622 will only accept OTP encrypted commands from the phone 620 and the phone 620 will only accept OTP encrypted responses from the refrigerator 622. Since the WOCU chips 650, 652 contain enough bits for the lifetime of pairing, the refrigerator 622 cannot be hacked even when connected to the Internet, or another accessible network.

Figure 7:
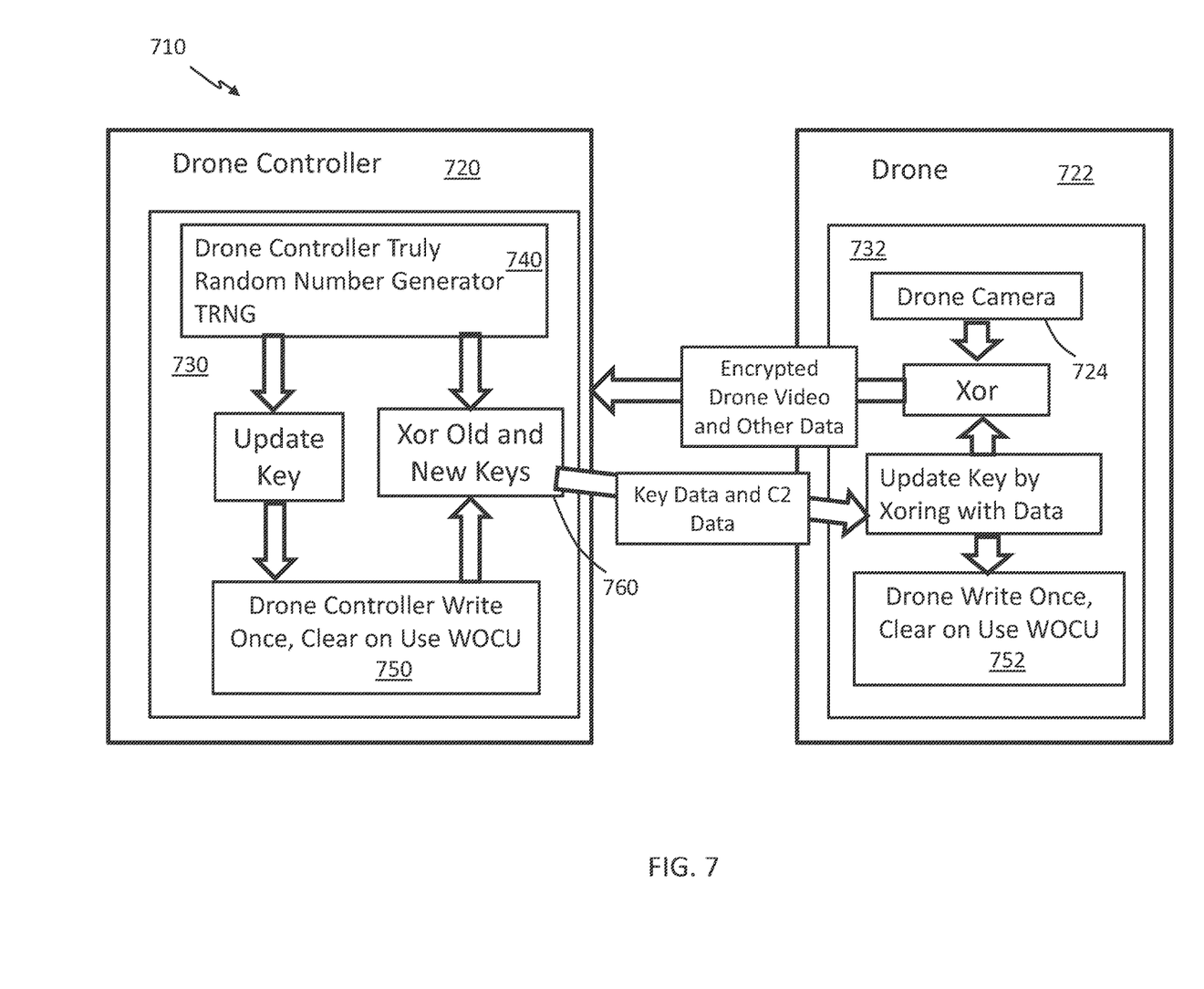
FIG. 7 is a diagrammatical illustration of a key distribution process between command and control devices, in one example, in accordance with exemplary embodiments of the present disclosure.

Key distribution may be further enhanced for command and control devices, such as, for instance, remote, electronic controllers for devices such as drones. To this end, FIG. 7 is a diagrammatical illustration of a key distribution process 710 between command and control devices, in one example, in accordance with exemplary embodiments of the present disclosure. For instance, in one example, a drone controller 720 may electronically pair with a drone 722. The drone controller 720 may have an encryption chip 730 which has both a TRNG 740 and a WOCU circuit 750. The drone 722 also has a WOCU circuit 752 on its chip 732. The drone controller 720 and drone 722 may be manufactured with a generated key.

During the pairing process between the drone controller 720 and the drone 722, the drone controller 720 generates a new key using the TRNG generator 740 and stores the new key in the drone controller's 720 WOCU memory 750. The new key is then transmitted to the drone 722 along with the key from the manufacturer. Both keys may be transmitted in an encrypted state, such as by using an Xor process, as shown at block 760. In addition to the keys, additional data may be transmitted in an encrypted state, such as command and control (C2) data, or other data that is desired to be transmitted to the drone 722. The drone 722 receives the encrypted key, decrypts it with the stored producer's key, and stores the new key in its WOCU circuit 752. The drone controller 720 and the drone 722 now have the same key which has never been exposed by either the drone controller 720 or the drone 722, or in the communication signal between them. The two devices may communicate with full confidence of unbreakable security.

As can be seen, this process between a drone controller 720 and the drone 722 may use the same method of TRNG bit generation, WOCU storage, and transmission during pairing as described relative to previous figures, and it may work successfully for drones and all IoT devices that require unbreakable security.

In addition, a sensor on the drone 722, such as a drone camera 724, may capture data which can be encrypted using an Xor process with the updated key. This may allow the drone 722 to transmit encrypted drone video or images, or other captured data such as telemetric data about the drone and other data which relates to the drone or an operation thereof, or information otherwise captured by the drone, back to the drone controller 720 in an encrypted state. It is further noted that the encrypted data transmitted to or from the drone 722 and the drone controller 720 may also include command and control data, such as the control signals for controlling operation of the drone 722 itself. The technology described herein can be used with conventional drones, such as drones operating in aerial environments, on the land, or in other settings, but it is also possible to use the same encryption techniques for satellite systems in orbit. Indeed, many satellite systems lack significant security protocols, such that the technology described herein can be implemented in new satellites and adopted for existing satellites to ensure that all data communicated to and from satellite systems can be kept secure.

Relative to both FIGS. 6-7, since corresponding WOCU bits are cleared upon use, neither the phone, or the IoT device, or the drone controller, or drone can be hacked while in use or to discover previously sent commands or information.

FIGS. 8A-8D are diagrammatical illustrations of a WOCU memory chip 810, in one example, in accordance with exemplary embodiments of the present disclosure. As shown, the memory chip 810 with WOCU may have at least four selectable modes for OTP applications. These modes include: a load memory from an external source (LOAD mode), FIG. 8A; a clone memory to an external source (CLONE mode), FIG. 8B; a clear on read mode, any memory read is immediately cleared (WOCU mode), FIG. 8C; and a wipe mode where all memory data is wiped (WIPE mode), FIG. 8D.

The use of the WOCU memory chip 810 in OTP encryption applications may include the following steps:

1. Initially the chip is put into LOAD mode and loaded with truly random bits from an external source
2. Next the chip is put into CLONE mode and copied to another WOCU chip that is in LOAD mode
3. During use, the chip is put into WOCU mode to encrypt data using OTP encryption, as data is encrypted using the bits in the chip's memory, those memory locations on the WOCU chip are cleared
4. Later, the encrypted data is decrypted using the CLONED WOCU chip. In fact, without the cloned WOCU chip, it may be impossible to decrypt the data.

Figure 8A:
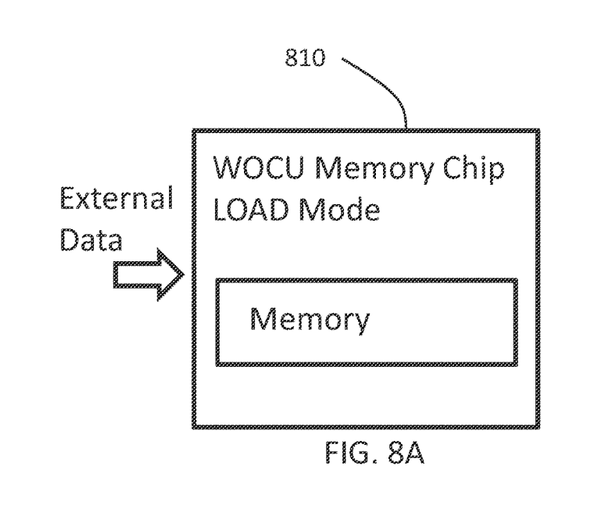
FIGS. 8A-8D are diagrammatical illustrations of a WOCU memory chip, in one example, in accordance with exemplary embodiments of the present disclosure.
Figure 8B:
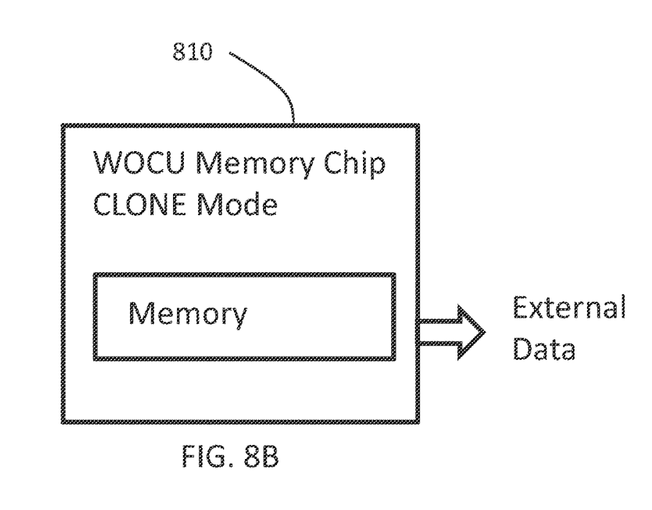
Figure 8C:
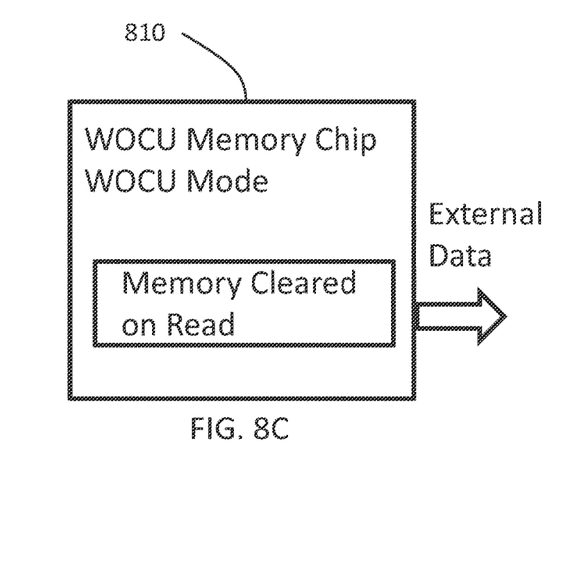
Figure 8D:
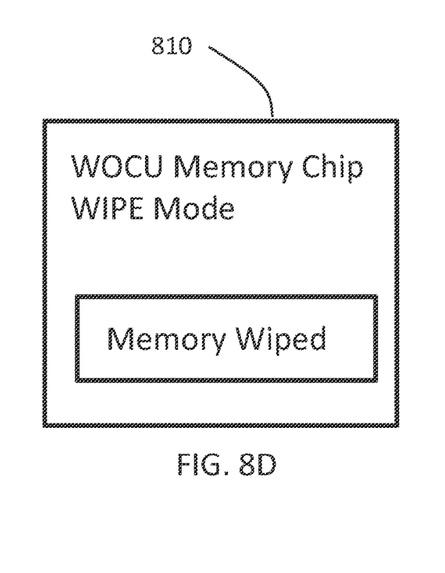

Additionally, for added security, the WOCU memory chip 810 may be put onto a "tamper evident" board or chip, such as previously described, where any tampering of the board trips the WIPE mode of the WOCU chips on the board. It is noted that WOCU memory chips 810 can be on motherboards, daughter boards, or even USB devices. WOCU memory chips 810 can also be loaded and cloned as pairs at a factory and sold as pairs or this can be done on a motherboard.

Relative to any example of this disclosure, it is noted that key data with key bits may be stored on a memory of the IC chip or in a module, where the key data includes a large number of key bits which can be used for multiple encryption and decryption processes. For instance, the key data may include 100,000 bits where key bits used for a particular encryption and decryption process may include only 1,000 bits. As such, a key loaded on the memory may be used multiple times, but the key bits within the key are used only once, as required by OTP encryption. When the particular key bits are used for encryption or decryption and data is transferred between devices, the key bits themselves may not be transferred, but rather, the key bits may be identified with a bit offset, which is a positional address of the block of random bits within all of the random bits of the key data. For instance, the bit offset may be a numerical address where a certain number of bits within a certain location, such as by line or column, were used for encryption of the source data. In one example, the bit offset may be data that indicates bits 501 through 1000 were used for the encryption, or that the block of bits starts at 1,001 and 500 bits were used.

Figure 9:
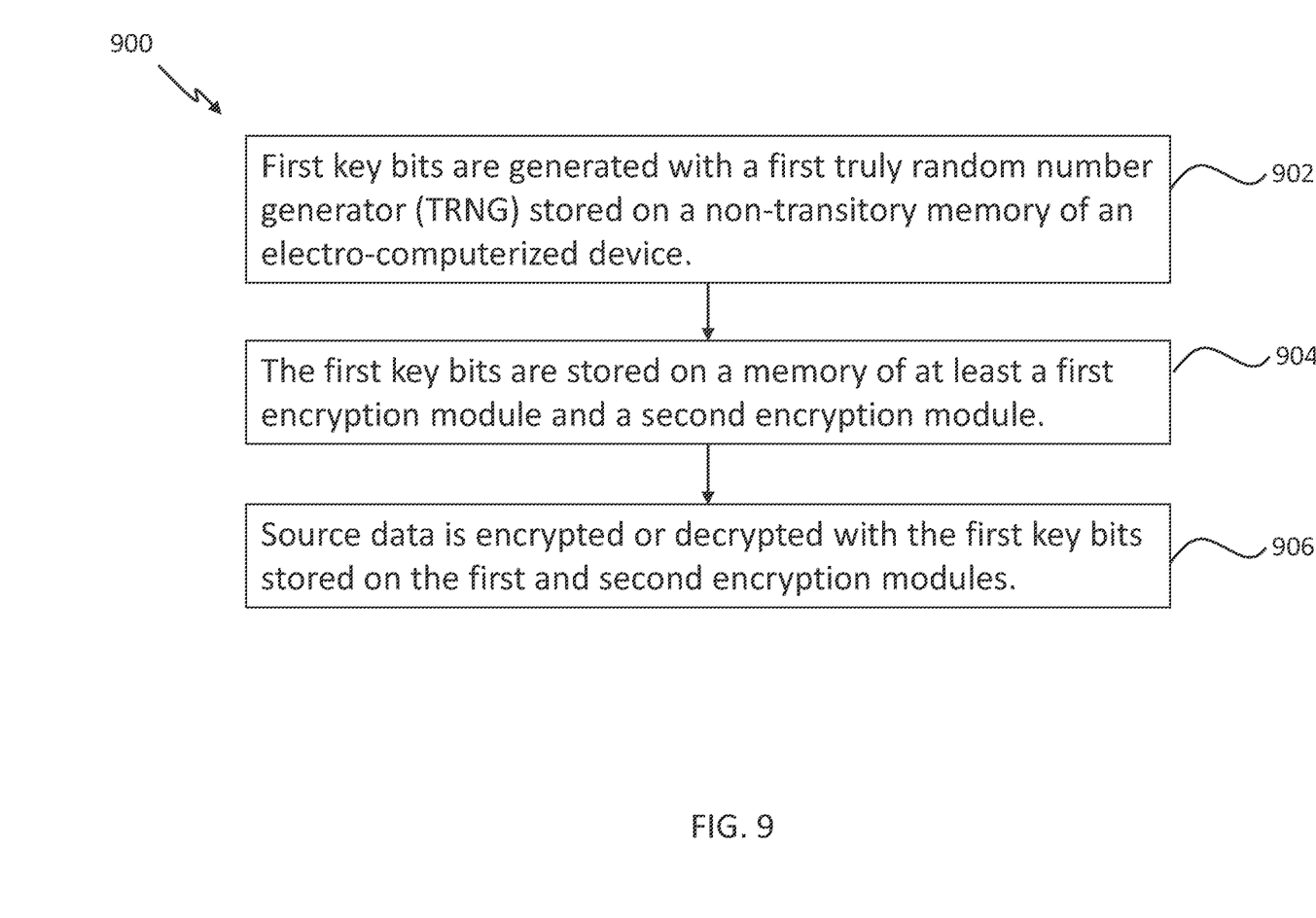
FIG. 9 is a flowchart illustrating a method of providing secure data encryption, in accordance with the embodiments of the disclosure.

FIG. 9 is a flowchart 900 illustrating a method of providing secure data encryption, in accordance with the embodiments of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 902, first key bits are generated with a first TRNG stored on a non-transitory memory of an electro-computerized device. The first key bits are stored on a memory of at least a first encryption module and a second encryption module (block 904). Source data is encrypted or decrypted with the first key bits stored on the first and second encryption modules (block 906). Any number of additional steps, functions, processes, or variants thereof may be included in the method, including any disclosed relative to any other figure of this disclosure.

It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A multimodal integrated circuit (IC) chip for use in cryptography, the IC chip comprising:
   a chip substrate; and
   a memory positioned on the chip substrate, wherein when key bits from key data are stored on the memory, unauthorized access of the key bits is prevented.

2. The IC chip of claim 1, wherein a read out of the key bits from the memory is blocked to prevent the unauthorized access of the key bits.

3. The IC chip of claim 1, further comprising a tamper sensor connected to the memory, wherein the key bits are deleted from the memory upon sensing a tamper event of the tamper sensor to prevent unauthorized access of the key bits.

4. The IC chip of claim 3, wherein the key bits are deleted by zeroization or oneization.

5. The IC chip of claim 3, wherein the tamper event further comprises a violation of a tamper enclosure or sensing a change in temperature, voltage, or a physical environmental condition of the memory.

6. The IC chip of claim 1, wherein a portion of the key bits of the key data is deleted after use with encrypting source data.

7. The IC chip of claim 6, wherein the source data is derived from a remote sensing device.

8. The IC chip of claim 1, wherein the unauthorized access of the key bits is prevented by preventing unauthorized access from Artificial Intelligence (AI) devices.

9. An encryption device for use in cryptography, the encryption module comprising:
   an electro-computerized device having at least one non-transitory memory;
   a first truly random number generator (TRNG) stored on the non-transitory memory;
   at least a first encryption module having a memory for key storage; and
   at least a second encryption module having a memory for key storage, wherein first key bits generated with the first TRNG are stored on the memories of the first and second encryption modules, and wherein source data is decrypted or encrypted with the first key bits stored on the memories of the first and second encryption modules.

10. The encryption device of claim 9, further comprising a Faraday cage positioned around the electro-computerized device having the at least one non-transitory memory and the first TRNG.

11. The encryption device of claim 9, wherein the source data is decrypted or encrypted with the first key bits stored on the memories of the first and second encryption modules while the first and second encryption modules are positioned remote from one another.

12. The encryption device of claim 9, wherein ancillary data is stored on the memories of the first and second encryption modules, wherein the ancillary data further comprises at least one of metadata about the first key bits, an identity of a producer of the first or second encryption module, a serial number of production equipment used to produce the first or second encryption module, a number of key bits generated, or a number of encryption modules loaded with the first key bits.

13. The encryption device of claim 9, wherein one of the first or second encryption modules is a master module having a second TRNG, wherein second key bits are generated by the second TRNG, and wherein the first key bits are encrypted with the second key bits.

14. The encryption device of claim 9, wherein one of the first and second encryption modules is positioned on an Internet-of-things (IoT)-enabled device.

15. A method of providing secure data encryption, the method comprising:
   generating first key bits with a first truly random number generator (TRNG) stored on a non-transitory memory of an electro-computerized device;
   storing the first key bits on a memory of at least a first encryption module and a second encryption module; and
   encrypting or decrypting source data with the first key bits stored on the memory of the first and second encryption modules.

16. The method of claim 15, further comprising generating the first key bits in a Faraday cage.

17. The method of claim 15, further comprising positioning the first encryption module and the second encryption module remote from one another while encrypting or decrypting the source data.

18. The method of claim 15, further comprising storing ancillary data on the memory of the first and second encryption modules, wherein the ancillary data further comprises at least one of metadata about the first key bits, an identity of a producer of the first or second encryption module, a serial number of production equipment used to produce the first or second encryption module, a number of key bits generated, or a number of encryption modules loaded with the first key bits.

19. The method of claim 15, further comprising:

generating second key bits with a second TRNG on one of the first or second encryption modules;

encrypting the first key bits with the second key bits; and transmitting the encrypted first key bits with the second key bits to another of the first or second encryption modules.

20. The method of claim 15, further comprising positioning one of the first or second encryption modules on an Internet-of-things (IoT)-enabled device.

\* \* \* \* \*